UNITED STATES PATENT OFFICE.

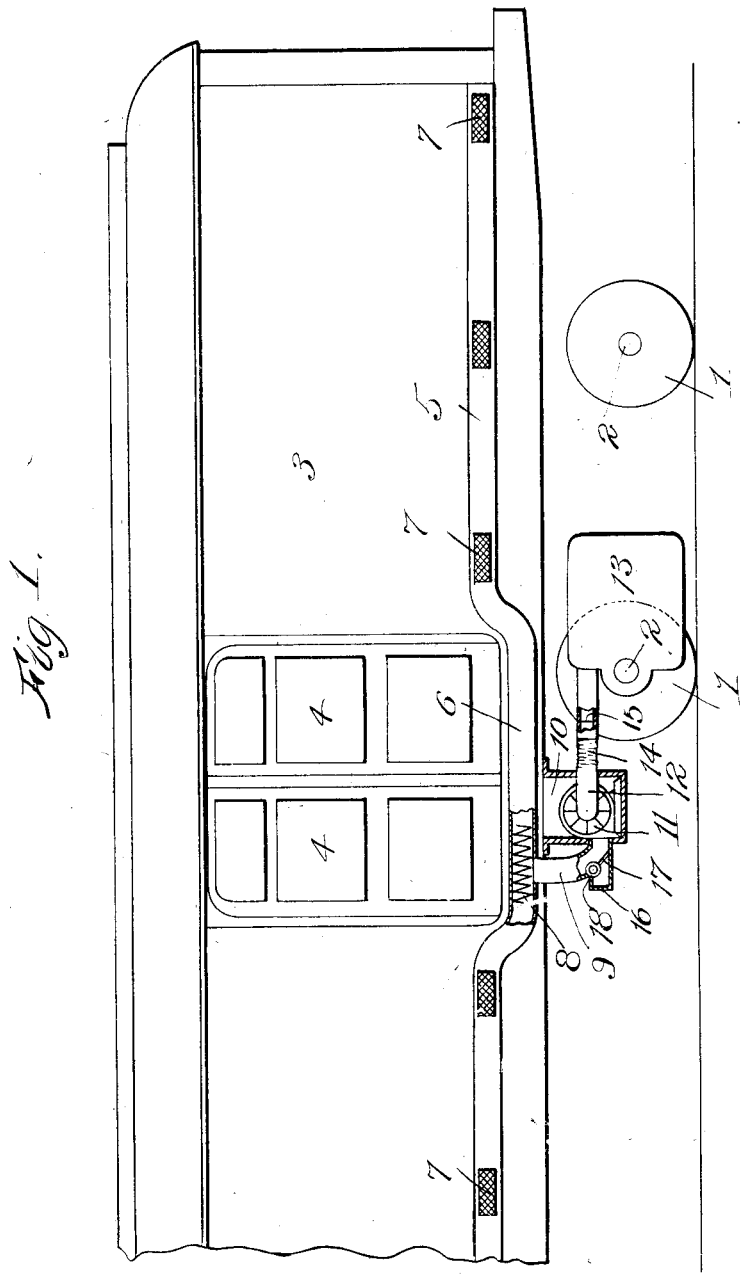

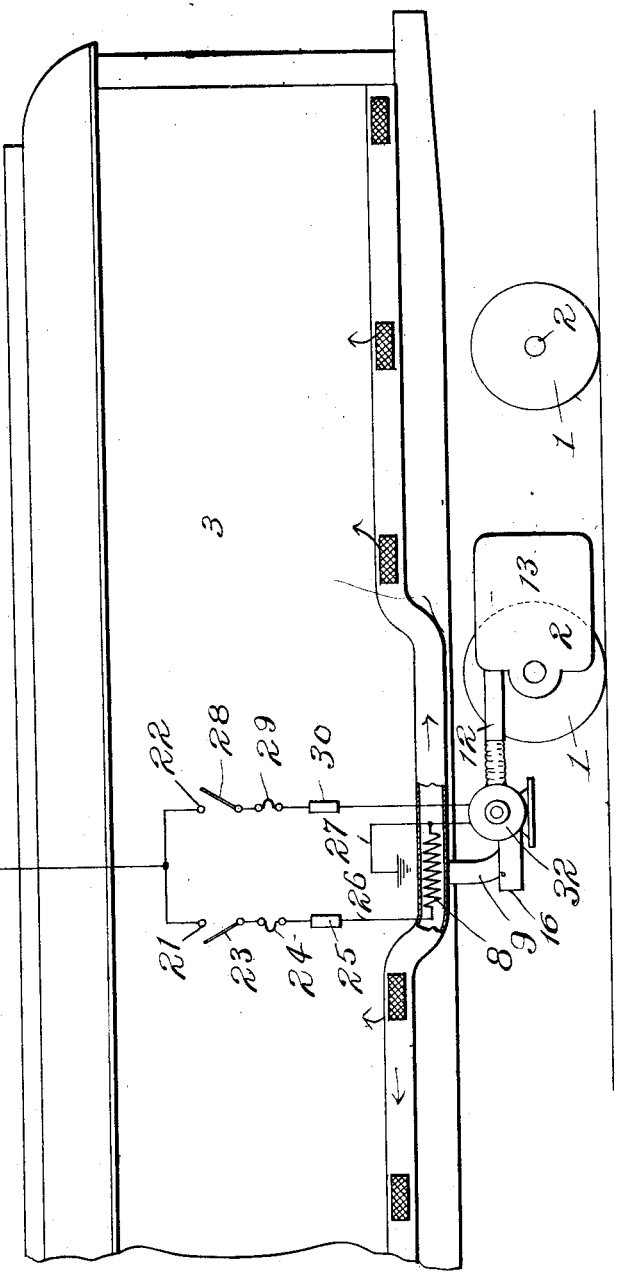

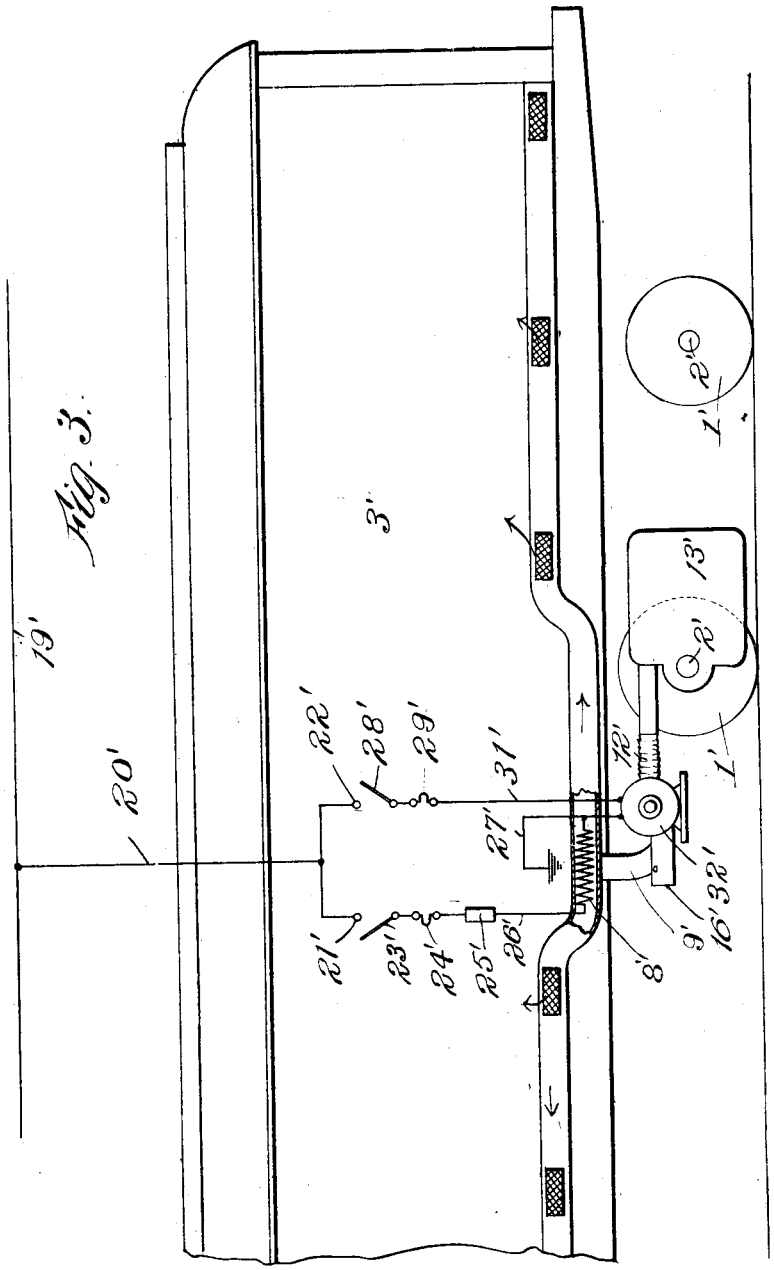

WILLIAM S. MENDEN, OF BROOKLYN, NEW YORK, ASSIGNOR TO MEGOSIN COMPANY, INC., A CORPORATION OF NEW YORK.

CAR-HEATER.

1,106,334.  Specification of Letters Patent.  Patented Aug. 4, 1914.

Application filed March 24, 1914. Serial No. 826,900.

*To all whom it may concern:*

Be it known that I, WILLIAM S. MENDEN, a citizen of the United States, residing in the borough of Brooklyn, county of Kings, and State of New York, have invented certain new and useful Improvements in Car-Heaters, of which the following is a full and clear specification.

This invention relates to heating systems for vehicles and has for its primary object to provide improved means for utilizing the heat produced by the motor of said vehicle and for operating said heat-utilizing means coöperatively with a heating device which is specifically and solely intended for vehicle-heating purposes.

Collateral and incidental purposes will appear in the specification and be pointed out in the appended claims, reference being had to the accompanying drawings, in which my invention is illustrated in several embodiments in its adaptability to a rapid transit passenger car, it being obvious from the following description that the same could be embodied in a motor-propelled vehicle of almost any type.

In the drawings, Figure 1 is a diagrammatic inside elevation of a passenger car provided with a heating system constructed in accordance with the principles of the present invention, parts being broken away and parts shown in section; Fig. 2 is a similar diagrammatic view illustrating one embodiment of the controlling circuits; and Fig. 3 is a similar diagrammatic view showing another embodiment of the controlling circuits.

Referring more particularly to the drawings, the truck wheels 1 (shown diagrammatically) are carried by axles 2 journaled in suitable trucks (not shown). According to the embodiment shown in Fig. 1, the car body 3 is provided with doors 4 intermediately of the ends of the car in consequence of which a duct or conduit 5 which extends lengthwise of the car for distributing the heat from a heat-conveying fluid, is provided with a depressed portion 6 to accommodate said doors 4. The heat-conveying fluid is preferably air by means of which a considerable degree of quiet ventilation may be had while the car is being heated, as will appear hereinafter. At regular intervals throughout its length, the pipe 5 is provided with registers 7 through which the heated air is discharged. Within the duct 5 and preferably within the depressed portion 6 thereof, is disposed a heating device preferably in the form of a heating coil 8, preferably disposed across the discharge outlet of a branch or elbow 9 which constitutes a connection leading from an air chamber 10 within which is mounted a pump, preferably in the form of a rotary fan or blower 11 to the duct 5. Said fan 11 is suitably disposed to discharge into said branch or elbow 9 and is provided with a suction pipe 12, leading from a housing 13 which incases the motor (not shown), which drives one of the axles 2. In order to permit the truck to swing during the turning movements of the car, the pipe 12 is provided with a flexible portion 14. Within suction pipe 12, a strainer 15 is installed to prevent the inrush of dirt from the outside air. Projecting horizontally from the branch or elbow 9, is an inlet portion or branch 16 which is normally closed in cold weather by a gate or valve which is preferably in the form of a plate 17 pivoted to swing about a pin 18. With the arrangement of parts shown in Fig. 1, the air is drawn into the car by way of the housing 13, which is provided with sufficient crevices here and there (not shown) to supply the required amount of air.

Referring now to Fig. 2 in which one embodiment of the operating circuits is shown, the trolley line 19 is connected by a line 20 (including the trolley pole) which branches to the contacts 21 and 22. A switch 23 is adapted to close a circuit for energizing the heating coil 8. Said circuit includes a fuse 24, a thermostat 25, a wire 26 which is connected to the coil 8, and a grounded line 27. Another branch circuit for controlling the operation of pump 11, includes a switch 28, fuse 29, thermostat 30, and lead wire 31 which is connected to one terminal of a motor 32 which drives the fan 11, the other terminal of said motor being connected to the ground line 27.

In the modification shown in Fig. 3, the circuit for energizing the heating coil 8', includes trolley wire 19', and line 20', contact 21', switch 23', fuse 24', thermostat 25', wire 26' and ground wire 27'. For controlling the motor 32', an electric circuit is provided which includes trolley line 19, line 20', contact 22', switch 28', fuse 29', line 31' which is connected to one terminal of motor 32', and ground wire 27'.

From the foregoing description, the method of operation and the advantages to be derived therefrom will be readily understood. In moderately cold weather, when it is desired merely to take the chill out of the air in the car, sufficient heat may be obtained from the motor housing 13 alone without at the same time causing the temperature of the armature to rise to an undesirable degree. For this purpose, the switch 28 (see Fig. 2) is closed and the motor 32 started, the switch 23 being allowed to remain open and the coil 8 remaining unenergized. Thus as the car goes into service, air is pulled through the motor housing 13 and warmed by the armature therein, the valve or gate 17 (see Fig. 1) being closed to direct the heated air column upwardly through the branch 9 into the duct 6 which discharges into the car through the registers 7. If perchance the temperature of the air in the car or vehicle, rises above a predetermined maximum, the thermostat operates to break the fan motor circuit and the injection of heated air ceases. If on the other hand, extremely cold weather is experienced, both of the switches 23 and 28 may be closed and the car-ventilating air be heated by the energized coil 8 as well as by the main car-driving armature. By this combination of devices, it becomes possible to thoroughly heat a car much more rapidly than can be done by the coil 8 alone, or if a number of such heating coils are required, such number can be lessened with a consequent reduction in the consumption of power without any reduction of the heating effects. If desired the thermostats 25 and 30 can be adjusted to become operative under different degrees of temperature, thus providing a better graded and more accurate control of temperature in the car.

According to the modification shown in Fig. 3, the thermostatic control of the fan-motor circuit is not in use, said circuit being opened and closed as occasion demands, by means of the switch 28'. An arrangement like this is serviceable in places where a moderate supply of heat may be desirable at all times, the heating coil 8' being adapted to form a reserve source of heat which can be made operative when necessary. In this instance, it is sufficient to provide an automatic control of the reserve heat supply. Referring again to Fig. 1, in summer or at other times when the weather is warm or under any other conditions which makes it undesirable to supply heat to the car or vehicle, the fan or pump 11 can be operated alone for keeping down the temperature of the car-driving motor. For this purpose, switch 23 remains open while switch 28 remains closed, the air drawn through the housing of the car-propelling motor, being expelled by way of the outlet opening in the horizontal branch from the elbow 9. In this case, the valve or gate 17 is raised into position to close the elbow 9 and open the said outlet.

I claim:

1. The combination with a vehicle, of a motor therefor, a housing for said motor, a heating device other than said motor, and common means for conveying heated fluid from said heating device and motor housing, said conveying means being adapted to convey heated fluid from either said heating device or motor housing separately.

2. The combination with a vehicle, of a heating device therefor, a motor for said vehicle, a housing for said motor, and means for supplying heated air to said vehicle from said housing and heating device coöperatively, said means being adapted to deliver heated air from either said heating device alone or from said motor housing alone.

3. The combination with a vehicle, of a motor therefor, a housing for said motor, a heating device other than said motor, and means for conveying heated air from either said heating device or said motor housing.

4. The combination with a vehicle, of an air duct discharging into the body of said vehicle, heating means suitably disposed to heat the air passing through said duct, a thermostat for controlling the operation of said heating means, a motor for the vehicle and a housing for said motor, said housing being connected up to said duct to discharge air heated by the motor into said duct.

5. The combination with a vehicle, of an air duct discharging into the body of said vehicle, heating means suitably disposed to heat the air passing through said duct, a thermostat for controlling the operation of said heating means, a motor for the vehicle, a housing for said motor, a connection extending between said housing and said duct to discharge air heated by the motor thereinto, and means for opening and closing the connection between said housing and duct.

6. The combination with a vehicle, of an air duct discharging into the body of said vehicle, heating means suitably disposed to heat the air passing through said duct, a thermostat for controlling the operation of said heating means, a motor for the vehicle, a housing for said motor, a connection extending between said housing and said duct to discharge air heated by the motor thereinto, and means for opening and closing the connection between said housing and duct, said opening and closing means being thermostatically controlled.

7. In a heating system for vehicles, the combination with a duct for the heating medium, a heating device operatably related to said duct, a motor for said vehicle, a housing for said motor, means for forcing a heat-receiving medium through said housing and into said duct, and means for alternately rendering said heating device and forcing means active.

8. In a heating system for vehicles, the combination with a duct for the heating medium, a heating device operatably related to said duct, a motor for said vehicle, a housing for said motor, means for forcing heat-receiving medium through said housing and into said duct, and means for alternately rendering said heating device and forcing means active, said heating device and forcing means being further adapted to be made operative simultaneously.

9. In a heating system for vehicles, a heating coil, a motor for said vehicle, means for utilizing the heat from said motor to heat the vehicle, and a thermostat for controlling the energization of said coil.

10. In a heating system for vehicles, a heating coil, a motor for said vehicle, means for utilizing the heat from the motor to heat the vehicle, a thermostat for controlling the energization of said coil, and a thermostat for controlling said heat-utilizing means.

11. In a heating system for vehicles, a heating coil, a motor for said vehicle, means for utilizing the heat from said motor to heat the vehicle, said means including a pump for displacing the heat-conveying medium, and a thermostat for controlling said pump.

12. In a heating system for vehicles, an air duct for conveying air into said vehicle, a heating coil arranged in said duct, an electric circuit for said heating coil including a thermostat, a motor for said vehicle, a housing therefor adapted to receive and contain air in suitable relation to said motor to be heated thereby, said air duct being provided with a branch connected to said housing, an air pump, and means adapted to deflect the air from said housing into the outer air or into that portion of the air duct discharging into said vehicle.

13. In a heating system for vehicles, a motor for said vehicle, means for conveying the heat from said motor to heat the vehicle, and thermostatic means for controlling said heat conveying means.

14. In a heating system, for vehicles, a motor for said vehicle, means for conveying heated fluid from said motor to the interior of said vehicle, said means including a fluid-displacing pump, and a thermostat for controlling the operation of said fluid conveying means.

WILLIAM S. MENDEN.

Witnesses:
 WM. A. COURTLAND,
 A. O. KNIGHT.